United States Patent
Kume et al.

(10) Patent No.: US 8,419,196 B2
(45) Date of Patent: Apr. 16, 2013

(54) OPTICAL MIRROR

(75) Inventors: Masami Kume, Tokyo (JP); Hajime Takeya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 12/957,898

(22) Filed: Dec. 1, 2010

(65) Prior Publication Data

US 2011/0128642 A1    Jun. 2, 2011

(30) Foreign Application Priority Data

Dec. 1, 2009    (JP) .................................. 2009-273568

(51) Int. Cl.
*G02B 7/18* (2006.01)

(52) U.S. Cl.
USPC ......................................... 359/512; 359/846

(58) Field of Classification Search .................. 359/291, 359/292, 293, 295, 846, 848, 512
See application file for complete search history.

(56) References Cited

U.S. PATENT DOCUMENTS 3,904,274 A * 9/1975 Feinleib et al. ............... 359/295
7,192,145 B2    3/2007 Ealey

FOREIGN PATENT DOCUMENTS

| JP | 10-284390 | 10/1998 |
| JP | 2004-13010 | 1/2004 |

* cited by examiner

*Primary Examiner* — Euncha Cherry
(74) *Attorney, Agent, or Firm* — Oblon, Spivak, McClelland, Maier & Neustadt, L.L.P.

(57) ABSTRACT

An optical mirror comprising: a mirror body having a reflective surface; a waffle structure that is connected to a surface opposite to the reflective surface of the mirror body, the waffle structure comprising partition walls, wherein at least one of the partition walls includes a heat generation part; and a power supply part configured to supply power to the heat generation part, wherein the partition walls and the mirror body are made of a same material.

5 Claims, 2 Drawing Sheets

OPTICAL MIRROR

CROSS-REFERENCE TO RELATED APPLICATIONS

This application claims priority from Japanese Patent Application No. 2009-273568 filed on Dec. 1, 2009, the entire contents of which are incorporated herein by reference.

TECHNICAL FIELD

The invention relates to an optical mirror for a large telescope that is used in space or above ground.

BACKGROUND

An earth observation satellite or a space observation satellite that is used on an orbit of a satellite is exposed to a rapid and high change in input and output of heat, which results from environmental change of days and nights due to rays of the sun and shadow of the earth under vacuum environments.

Therefore, an optical mirror mounted to the satellite is also exposed to the change in input and output of heat. When the optical mirror is made of a material having a coefficient of thermal expansion which is not zero, thermal strain is caused to the optical mirror due to the change in input and output of heat. In this case, the change in input and output of heat is not applied to the entire optical mirror but there is a distribution in the change in input and output of heat, and thus, a temperature distribution (temperature gradient) is necessarily generated in the optical mirror. As a result, the optical mirror is not uniformly deformed but local thermal strain is caused corresponding to the temperature distribution. Accordingly, a reflective surface of the optical mirror is deformed due to the thermal strain, resulting in deterioration of optical characteristics such as blurring or distortion of a captured image.

In view of the above-described problem, a method has been suggested in which a heat conduction member is connected, between a mirror and an optical mount which maintains the mirror via a support member, using high heat conduction adhesive, and heat generated from a mirror surface of the mirror is promptly conducted to the optical mount through the heat conduction member to decrease a temperature distribution of the mirror (for example, JP-A 2004-13010 (page 3 and FIG. 1)).

Another method has been suggested in which temperature distribution detection means for detecting a surface temperature distribution on a surface of a mirror and temperature control means including a hot wire heater and a fan for partially heating and cooling a backside of the mirror are provided and the temperature control means is operated based on the detected surface temperature distribution, thereby adjusting the surface temperature distribution of the mirror (for example, JP-A 10-284390 (page 3 and FIG. 3)).

However, according to the above method in which the heat conduction member is connected between the mirror and the optical mount and the heat generated at a mirror surface of the mirror is promptly conducted to the optical mount through the heat conduction member to decrease a temperature distribution of the mirror, the coefficient of thermal expansion of the member configuring the mirror is different from the coefficient of thermal expansion of the high heat conduction adhesion or the heat conduction member. Therefore, thermal strain is inevitably generated at a part to which the heat conduction member is connected, so that local deformation of the mirror at the corresponding part can not be prevented.

In addition, according to the above method of operating the hot wire heater and the fan based on the surface temperature distribution of the mirror and thereby adjusting the surface temperature distribution of the mirror, the coefficient of thermal expansion of the member configuring the mirror is different from the coefficient of thermal expansion of the hot wire heater. Therefore, generation of thermal strain at a part to which the hot wire heater is adhered cannot be prevented, and thus, local deformation of the mirror at the corresponding part can not be prevented.

SUMMARY

Accordingly, it is an aspect of the present invention to suppress local thermal strain of a mirror, thereby preventing deterioration of optical characteristics such as blurring or distortion of a captured image.

According to an illustrative embodiment of the present invention, there is provided an optical mirror comprising: a mirror body having a reflective surface; a waffle structure that is connected to a surface opposite to the reflective surface of the mirror body, the waffle structure comprising partition walls, wherein at least one of the partition walls includes a heat generation part; and a power supply part configured to supply power to the heat generation part, wherein the partition walls and the mirror body are made of a same material.

Accordingly, the waffle structure made of the same material as the mirror body maintains a shape of the mirror body and the at least one partition walls of the waffle structure includes a heat generation part. Therefore, it is possible to suppress local thermal strain of the mirror, thereby preventing deterioration of optical characteristics such as blurring or distortion of a captured image.

DETAILED DESCRIPTION

First Illustrative Embodiment

The materials which are used for making an optical mirror of the invention preferably satisfy following conditions.

(1) Specific strength, specific rigidity and fracture toughness are high.

(2) Having conductive characteristic as a resistance heating element.

(3) Coefficient of thermal expansion is low and heat conductivity is high.

(4) Manufacturing process is simple and shape productivity is high.

(5) Can be manufactured by a general equipment and workability is high.

(6) All of the shapes of the members can be manufactured by a single material and the members can be unified (combined)

In the first illustrative embodiment of the present invention, carbon fiber reinforced silicon carbide composite material (hereinafter, abbreviated as C/SiC) is selected as the material satisfying the above requirements, to make an optical mirror.

Figure 1:
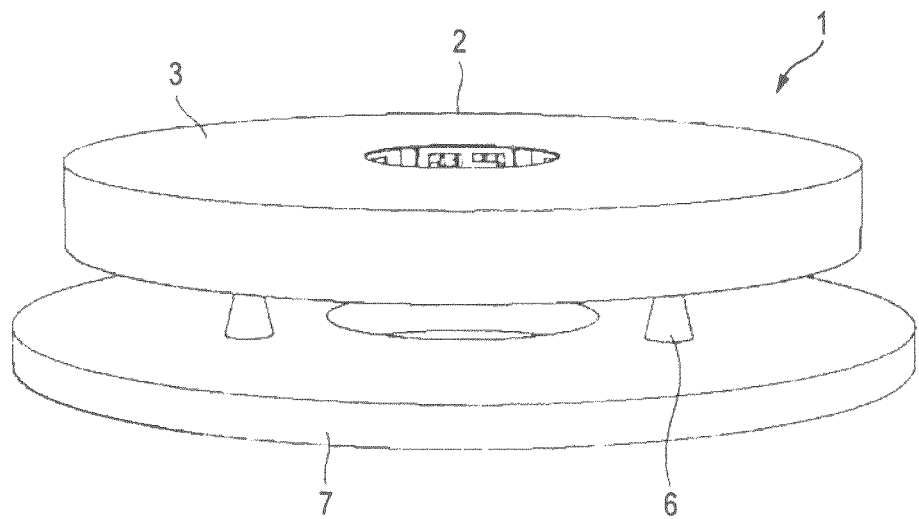
FIG. 1 is a schematic view of an optical mirror according to a first illustrative embodiment of the invention.

FIG. 1 is a schematic view of an optical mirror 1 according to an illustrative embodiment 1 of the invention.

A mirror body 2 has a concave mirror shape having an outer diameter of about 500 mm, an inner diameter of about 130 mm and a thickness of about 50 mm and has a focal distance of about 1572.5 mm. The mirror body 2 is formed into a predetermined shape by cutting a bulk of C/SiC. A reflective surface 3 of the mirror body 2 is formed with a thin film of aluminum. The thin film of aluminum is formed by sputtering, for example.

Figure 2:
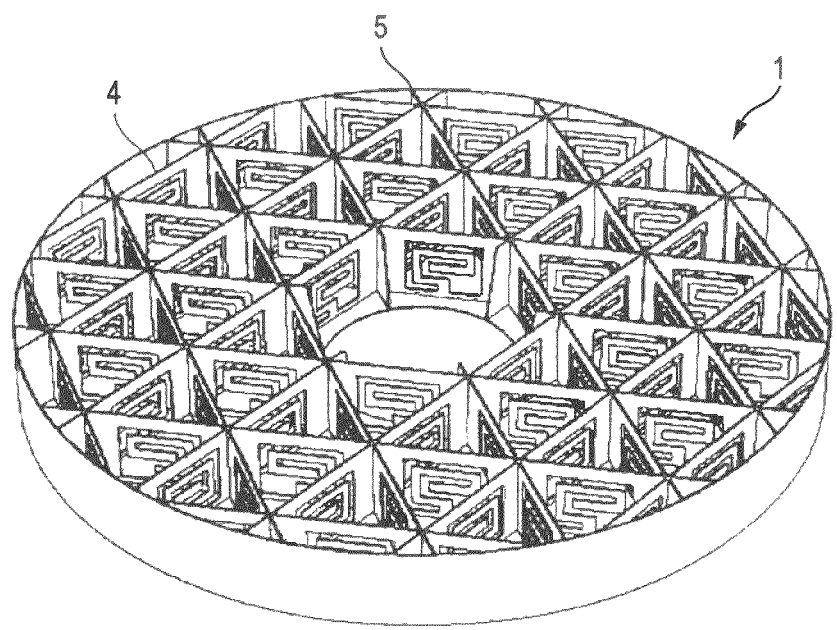
FIG. 2 is a schematic view of an optical mirror according to the first illustrative embodiment of the invention.

FIG. 2 is a schematic view of the optical mirror 1 according to the first illustrative embodiment of the invention, which is viewed from a surface opposite to a surface to which the reflective surface is formed. In FIG. 2, a backside of the optical mirror 1 is formed with partition walls 4 by cutting work. The partition walls 4 have a thickness of about 4 mm, are arranged so as to form regular triangles having a side of about 75 mm and configure a waffle structure 5. As shown in FIG. 1, the waffle structure 5 is fixed to an optical mount 7 by support members 6.

Figure 3:
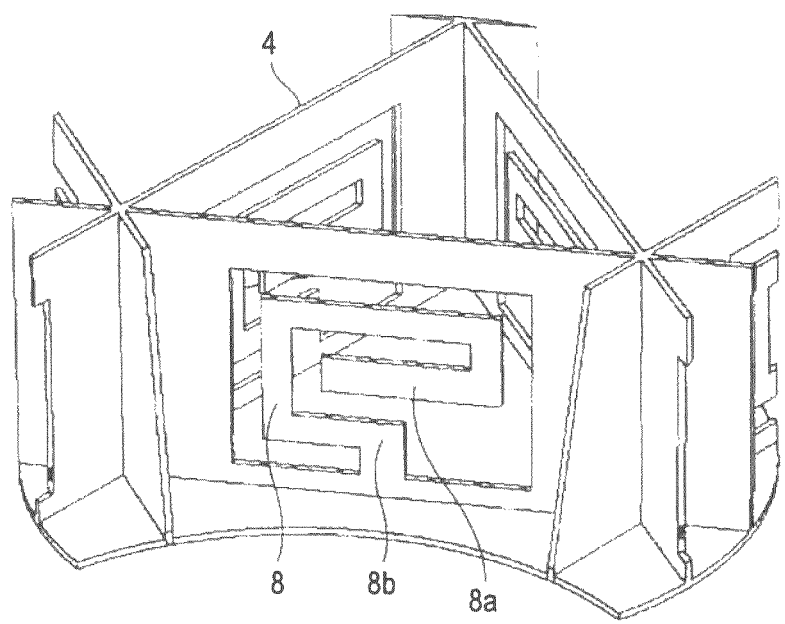
FIG. 3 is an enlarged schematic view of a heat generation part of an optical mirror according to the first illustrative embodiment of the invention.

FIG. 3 is an enlarged schematic view of the partition wall 4 of the first illustrative embodiment. The partition wall 4 includes a heat generation part 8 having a cross-section area smaller than a cross-section area of the other parts of the same partition wall 4. The heat generation part is formed by processing the partition wall 4 into a slit shape. The cross-section area of the heat generation part 8 is made to be smaller than the cross-section area of the other parts of the partition wall 4, thereby increasing electrical resistance of the heat generation part. A power supply part (not shown) is connected between a leading end portion 8a of the slit part and a base portion 8b of the slit part. By supplying power from the power supply part, it is possible to generate heat from the heat generation part 8.

In the optical mirror configured as described above, the reflective surface of the mirror body and the waffle structure formed on the backside of the mirror body are made of C/SiC. In addition, the heat generation parts formed at the partition walls of the waffle structure are also made of C/SiC. When the optical mirror is used on the orbit of a satellite, the optical mirror is always under state of heat output, except for heat input by irradiation of sunlight. When the sunlight is irradiated to the reflective surface of the optical mirror, the sunlight is not uniformly irradiated to the entire reflective surface but is typically non-uniformly irradiated. At this time, although the heat is non-uniformly input to the reflective surface of the optical mirror, the heat generation parts corresponding to positions of the reflective surface at which heat is less input are caused to generate heat. Thus, it is possible to match a temperature of the entire optical mirror to a temperature of the part to which heat is most input from the sun.

Further, since the support members do not directly support the reflective surface of the mirror body but supports it via the waffle structure, and the reflective surface of the mirror body and the waffle structure formed on the backside thereof are both made of C/SiC, it is possible to minimize the local thermal strain of the optical mirror.

According to the optical mirror of the illustrative embodiment, by making the reflective surface of the mirror body, the waffle structure formed on the backside thereof and the heat generation parts formed at the partition walls of the waffle structure by C/SiC, and by causing the heat generation parts, which correspond to positions of the reflective surface at which heat is less input, to generate heat, it is possible to match the temperature of the entire optical mirror to the temperature of the part at which the heat is most input from the sun. Therefore, it is possible to suppress local thermal strain of the mirror, thereby preventing deterioration of optical characteristics such as blurring or distortion of a captured image.

In the illustrative embodiment, the waffle structure is formed by arranging the partition walls to form a regular triangle shape. However, the waffle structure may be formed by arranging partition walls to form a quadrangle shape or a hexagon shape. Further, as shown in FIG. 2, in the illustrative embodiment, all of the partition walls respectively include a heat generation part. However, a partition wall having no heat generation part may be provided depending on the distance of the partition walls or a degree of permission of heat distribution.

Further, in the illustrative embodiment, the heat generation part is formed by processing the partition wall into a slit shape. However, it is not necessarily to form the heat generation part with the same material as the partition wall. For example, the heat generation part may be made of a material having the coefficient of thermal expansion close to that of the material configuring the partition wall, or a soft material having low rigidity.

Further, in this illustrative embodiment, C/SiC is selected as the material which satisfies the requirements for making the optical mirror. However, material such as beryllium may be used.

Further, although the waffle structure is fixed to the optical mount by the support member, a heat conduction member may be further connected between the waffle structure and the optical mount by high heat conduction adhesive. By providing the heat conduction member, it is possible to suppress an increase in temperature of the entire mirror body.

Second Illustrative Embodiment

The second illustrative embodiment of the present invention relates to measurement of the thermal strain of the optical mirror manufactured in the first illustrative embodiment.

Figure 4:
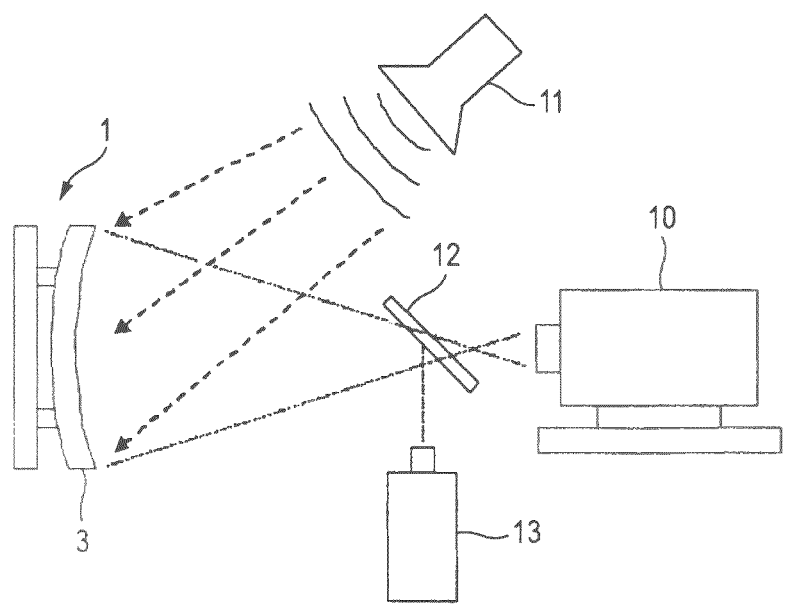
FIG. 4 is a schematic view of a method of measuring characteristics of an optical mirror in a second illustrative embodiment of the invention.

FIG. 4 is a schematic view of a measurement method for measuring thermal strain of an optical mirror according to the illustrative embodiment. In FIG. 4, an optical interferometer 10 is disposed opposite to the reflective surface 3 of the optical mirror 1. The optical interferometer 10 can measure surface accuracy of the reflective surface 3. In addition, a halogen lamp 11 is obliquely arranged at the front of the reflective surface 3. Further, a half mirror 12 is arranged between the reflective surface 3 and the optical interferometer 10, and a temperature measuring instrument 13 for measuring a temperature distribution of the reflective surface 3 through the half mirror 12 is disposed. As the optical interferometer 10, a GPI-XP laser interferometer-type shape measuring machine available from ZYGO Corporation may be used.

First, a temperature distribution of the reflective surface 3 was measured at a room temperature of 23.4° C. At the same time, a surface accuracy (wavefront aberration) of the reflective surface 3 was measured. As a result, the temperature distribution of the reflective surface 3 was 23.4° C.±0.1° C. and the wavefront aberration was 0.254 $\lambda$ (rms). Here, the wavefront aberration is turbulence of concentric spherical wavefronts having passed the optical system. In the illustrative embodiment, the wavefront aberration is defined as a root mean square (rms) of a standard deviation of deviation of concentric spherical wavefronts converged in the optical mirror and ideal wavefronts. In addition, $\lambda$ is a wavelength of a laser light source of the optical interferometer 10. For example, when a light source of the optical interferometer 10 is He—Ne laser, λ is 632.8 nm. When the wavefront aberration of a surface is equal to or less than Rayleigh limit (¼ λ), it is determined that there is no high difference between the surface accuracy of the surface and the surface accuracy of an ideal reflective surface.

Next, the halogen lamp 11 was turned on to irradiate the reflective surface 3 of the optical mirror 1, thereby supplying heat to the reflective surface 3 from the outside. After continuing the irradiation of the halogen lamp 11 for 60 minutes, a temperature distribution of the reflective surface 3 was measured. As a result, the upper part of the reflective surface 3, which is close to the halogen lamp 3, was 28.9° C. and the lower part of the reflective surface 3, which is far from the halogen lamp 3, was 24.6° C. That is, a temperature difference between the upper and lower parts of the reflective surface 3 was 4.3° C. Further, the wavefront aberration was 0.327 λ (rms) and a change in the wavefront aberrations was 0.073 λ (rms).

Next, based on the measurement result of the temperature distribution of the reflective surface 3 by the continuous irradiation of the halogen lamp, the temperature of the optical mirror was controlled by supplying the heat generation parts with power from the power supply part, so that the temperature of the entire reflective surface becomes uniform. Specifically, the temperature control was performed so that the entire temperature of the reflective surface 3 of the optical mirror was slightly higher than the temperature of 28.9° C. measured at the upper part of the reflective surface 3 close to the halogen lamp 11. As a result, the temperature distribution of the reflective surface 3 was 29.2° C.±0.2° C., the wavefront aberration was 0.254 λ (rms) and the change in the wavefront aberrations was 0.000 λ (rms). That is, there was no change in the wavefront aberrations.

From the result as described above, by controlling the heat generation parts to generate heat so that the entire temperature of the reflective surface of the optical mirror becomes uniform, it is possible to highly improve the range of the temperature distribution of the reflective surface from 4.3° C. to 0.4° C. and the change in wavefront aberrations from 0.073 λ (rms) to 0.000 λ (rms), compared to the case where the control is not performed.

As described above, when heat is supplied to the optical mirror from the outside, the heat generation parts included in the partition walls of the waffle structure, which is arranged at the backside of the reflective surface of the optical mirror, are caused to generate heat. Thus, it is possible to match the temperature of the entire optical mirror to the temperature of the part to which heat is input most. As a result, it is possible to prevent the deterioration of the surface accuracy due to the thermal strain and to maintain the stable optical performance.

The invention claimed is:

1. An optical mirror comprising:
   a mirror body having a reflective surface provided with a metal film thereon;
   partition walls forming a waffle structure that is connected to a surface of the mirror body opposite to the reflective surface of the mirror body, wherein at least one of the partition walls includes a heat generation part; and
   a power supply part configured to supply power to the heat generation part,
   wherein the partition walls and the mirror body are made of a same material, and wherein the mirror body and the waffle structure are made of carbon fiber reinforced composite material.

2. The optical mirror according to claim 1, wherein the heat generation part has a slit-shaped configuration, and a cross-section area of the heat generation part is smaller than a cross-section area of the partition wall other than the heat generation part.

3. The optical mirror according to claim 1, wherein the power supply part is configured to supply power to the heat generation part so that a temperature of the entire optical mirror becomes a predetermined temperature.

4. The optical mirror according to claim 3, wherein the predetermined temperature is a temperature of a part of the optical mirror to which exterior heat is input most.

5. The optical mirror according to claim 1, wherein the partition walls are arranged to form a regular triangular shape.

* * * * *